United States Patent [19]

Bragas

[11] Patent Number: 4,862,513

[45] Date of Patent: Aug. 29, 1989

[54] RADIO RECEIVER WITH TWO DIFFERENT TRAFFIC INFORMATION DECODERS

[75] Inventor: Peter Bragas, Hildesheim, Fed. Rep. of Germany

[73] Assignee: Robert Bosch GmbH, Stuttgart, Fed. Rep. of Germany

[21] Appl. No.: 162,607

[22] Filed: Mar. 1, 1988

[30] Foreign Application Priority Data

Mar. 23, 1987 [DE] Fed. Rep. of Germany ....... 3709523

[51] Int. Cl.[4] .............................................. H04B 1/06

[52] U.S. Cl. ...................................... 455/45; 340/905; 455/226; 455/228; 455/345

[58] Field of Search ..................... 455/32, 45, 55, 205, 455/212, 132, 226–228, 67, 108, 109, 203, 345, 102; 340/825.5, 825.72, 825.73, 905

[56] References Cited

U.S. PATENT DOCUMENTS

| | | | |
|---|---|---|---|
| 4,435,843 | 3/1984 | Eilers | 455/228 |
| 4,450,589 | 5/1984 | Eilers | 455/205 |
| 4,476,582 | 10/1984 | Strauss et al. | 455/345 |
| 4,517,562 | 5/1985 | Martinez | 455/45 |
| 4,633,517 | 12/1986 | Pfeifer | 455/45 |
| 4,731,769 | 3/1988 | Schaefer et al. | 455/345 |

FOREIGN PATENT DOCUMENTS

| | | | |
|---|---|---|---|
| 0200977 | 11/1988 | European Pat. Off. . | |
| 2518102 | 10/1976 | Fed. Rep. of Germany | 455/345 |

OTHER PUBLICATIONS

Neue Entwicklung auf Horfunkwellen, Funkschau 1/1986.

Elektronix fur Information und Navigation im Auto, Funk-Technik 41(1986), Heft 7, Prof. Dr.-Ing. Claus Reuber.

*Primary Examiner*—Robert L. Griffin
*Assistant Examiner*—Curtis Kuntz
*Attorney, Agent, or Firm*—Frishauf, Holtz, Goodman & Woodard

[57] ABSTRACT

An autombile radio capable of receiving VHF entertainment programs from a station in which traffic information signals are modulated in a 57 kHz subcarrier is equipped with two decoders for the 57 kHz subcarrier signals, one decoder for traffic information signals modulated in an analog fashion on the subcarrier and another decoder for digital signals modulated on that subcarrier by double-sideband suppressed-carrier modulation. The first decoder is for a system already in use in which traffic information, at least if urgent, is intended to override the entertainment program, and the receivier has the usual circuits for that override. The second decoder is for a system that is planned but not yet in use in which the received digital signals can call out one or more standard messages or message portions from a read-only memory and either the memory addresses or the memory outputs are storable. They are made audible by speech synthesizer and, because they are stored at least until the next message comes in, can be recalled if the user wishes. The receiver switch for turning on the traffic information feature is a selector switch with positions selecting either type of decoder and, in a modification designed for where both systems are available, the corresponding switching system gives priority to the presently existing system, since the output of the other system will not be lost and can be reproduced when the signals of the existing system have ceased.

16 Claims, 1 Drawing Sheet

RADIO RECEIVER WITH TWO DIFFERENT TRAFFIC INFORMATION DECODERS

This invention concerns a radio receiver, particularly for installation in a vehicle, having both a decoder for traffic information voice signals modulated on an auxiliary carrier wave of a broadcast signal and a decoder for digital traffic information compatibly but differently modulated on an auxiliary sub-carrier of the same frequency, appearing as part of the same broadcast signal.

THE BACKGROUND OF THE INVENTION

For improving the circulation of automobile traffic and traffic safety, certain radio broadcasting stations known as traffic radio stations have been used for transmitting traffic advice which can basically be received on any radio receiver. In order to make it easier for the driver of a vehicle select the traffic transmitter which is responsible for the region in which he is located, an already widespread information system known by the acronym ARI (Auto Radio Information) is in use in Europe that makes use of three designated frequencies additionally modulated, along with the program modulation of FM traffic radio transmitters operating in the VHF frequency band. This system has already been installed in a number of European countries.

For recognition and picking up of the traffic transmission a 57 kHz carrier is provided which identifies all traffic radio transmissions. For the purpose of recognition of the regional identity, the 57 kHz auxiliary carrier is modulated with one of six possible regional frequencies (referred to by letters A–F). In this manner information is given for recognizing to which traffic region the particular traffic radio transmission pertains.

For recognition of break-in transmissions, a second modulation of 125 Hz on the 57 kHz sub-carrier is utilized during a break-in announcement for identifying a particular traffic announcement that is intended to override other types of reception that may be in progress.

For the evaluation and processing of the above-mentioned three characterizing frequencies a special decoder is needed within the radio receiver and the known system advantageously makes possible the construction of economical traffic transmission decoders which are capable of compulsively bringing to audibility the more urgent traffic information. In this respect a supplementary receiver of the auto radio can search in a scanning mode for the appropriate traffic transmission by reference to transmitter and regional identifications. The vehicle driver is thereafter acoustically informed of traffic advice after recognition of the break-in message identification even if, for example, he is listening to another program or to music from the playing of a cassette.

Because of its many advantages, the above-described system has in the meanwhile become widely adopted. The known system, however, has not yet exploited all the available possibilities. Thus the radio program being listened to at the time by the vehicle driver is necessarily interrupted under the system just described for the duration of the traffic information break, which is often considered to be disturbing. Furthermore, the number of traffic advice items which can be transmitted is limited because of the necessary break-in time and also by the attention span the vehicle driver that may not last adequately in the case of longer traffic information breaks. Additional information breaks in foreign languages that are possible in some cases (for the benefit of transient drivers during vacation time) have magnified the "traffic break" durations.

For further improvement of an optimal traffic radio system, a system has become known through publications describing a traffic radio decoder for processing digital signals. These digital signals represent the traffic advice. They are recieved by demodulation of an auxiliary carrier on which the digital signals are modulated, as described in the publication "Internationales Verkehrswesen", reprint from Issue 5/85; Peter Brägas, Leit- und Informationssysteme im Kraftsfahrzeug—ein Beitrag zur Verbesserung des Verkehrsablaufs und der Verkehrssicherheit, pgs. 2–8.

These disclosures concern the radio data system (RDS) traffic transmission decoder. The system for which this decoder is designed involves the transmission of digital signals utilizing a sub-carrier of the same 57 kHz frequency above-mentioned modulated on a broadcast transmission signal in the VHF range , in which the modulation of the 57 kHz carrier is a double-sideband suppressed-carrier aplitude modulation with biphase-coded data signals. With biphase coding there appear no radio spectrum lines in the neighborhood of the auxiliary carrier, so that compatability of the radio data system (RDS) with the earlier system (ARI) is provided. The two systems can thus actually be combined and transmitted with the same broadcast signal.

The basic RDS concept envisions the transmission "digital storage addresses" or "code words". In the radio receiver, or especially in its traffic transmission decoder, components of messages or sentences of traffic advice are stored at respective addresses ready to be called out, either for visual display or for reproduction by means of a speech synthesizer. In the foreground of this system, therefore, there is not so much the sending of traffic advice as such but rather transmission of digital signals which represent particular pieces of advice, so that along with the RDS system other digital transmissions could in principle come, into consideration. What is significant is principally the recognition that traffic advice is becoming standardized. In spite of its multifarious nature it is capable of being subdivided into specific standard texts. This leads to important advantages in connection with digital signal transmission, since it is now possible to allocate address signals in a simple way to the specific content of the standarized traffic messages and to store these content packets in memory for electronic retrieval. All that is then needed from the traffic radio transmission is merely the transmission of the particular digital address signals within a RDS signal, so that traffic advice is transmitted only in the form of a storage address. At the present time the RDS development is only at the beginning of a technically practicable introduction, however, while the previous system above-described has been installed and used for a long time already. Since RDS has not yet been introduced into practice and the earlier system will not be abandoned overnight but rather will remain in use for a long transient phase, the problem facing the existing models of radio receivers is to make it possible for the user to receive, at his choice either the traffic information of the first system or only RDS traffic information. It is further to be taken into account that even in the future there will be countries in which the previous system will continue to be exclusively used and other countries in which the transition phase leading to the exclusive use of RDS may have extremely long duration. There is accordingly the risk that certain traffic announcements will not reach the listeners and particularly the vehicle driver whenever the radio transmitter used is not designed for the particular system for which the vehicles are equipped.

SUMMARY OF THE INVENTION

An object of the present invention is to provide a radio receiver which will offer the listener the opportunity, especially during the transition to the radio data system (RDS) to receive all traffic announcements that are broadcast.

Briefly, a receiver is provided with decoders both for ARI and RDS, including in the RDS decoder memory and message reproductions means and the switching means for selection between decoders and between traffic information and broadcast program, as well as switching means for the presently available override by ARI transmissions.

The invention is based on the concept that during a more protracted transition phase the tried and true ARI system will continue to be used alongside RDS systems. In certain regions the long-used existing system will continue to be exclusively used. Traffic announcements and traffic advice should reach the hearer with equal accessibility independently of the nature of the system over which it comes. This should be true even when the traffic advice is radiated simulaneously according to the first system and according to the RDS.

By the provision of both a traffic transmission decoder of the first system and also a traffic transmission decoder for RDS the radio receiver of the invention as well as a selector switch for selectively connecting to the amplifier of the radio either one of the decoders is assured that such a radio receiver will be capable of universal installation of both transmission systems for traffic information are in parallel use. Selection switching is so provided that received traffic advice talked to the listeners here from both systems at the same time having which would completely confuse the vehicle driver. Instead the listener or driver will always bring the announcement of either system to his attention and since the radio receiver can receive both systems, during the transition phase above-mentioned it is assured that no traffic announcements will be lost.

By a particular development of the invention it is provided that in the case of simultaneously reception of traffic advice both through the decoder of the earlier system and also through the RDS decoder the traffic transmission decoder of the earlier system will continue to have priority during the transition phase, when both are in use, for connection to the output amplifier of the radio. This solution is a particular advantage because the digital RDS traffic messages can be stored. It is therefore possible to reproduce first, acoustically, the traffic information of the first system and to make it possible, if needed, thereafter to retrieve storage the same information information transmitted in parallel by RDS thereby visual display or by speech sythesizer the latter choice depending upon the way of the receiver is equipped for calling out the stored information.

BRIEF DESCRIPTION OF THE DRAWINGS

The invention is further described by way of illustrative example with reference to the amenxed drawings, in which.

DESCRIPTION OF THE ILLUSTRATED EMBODIMENTS

Figure 1:
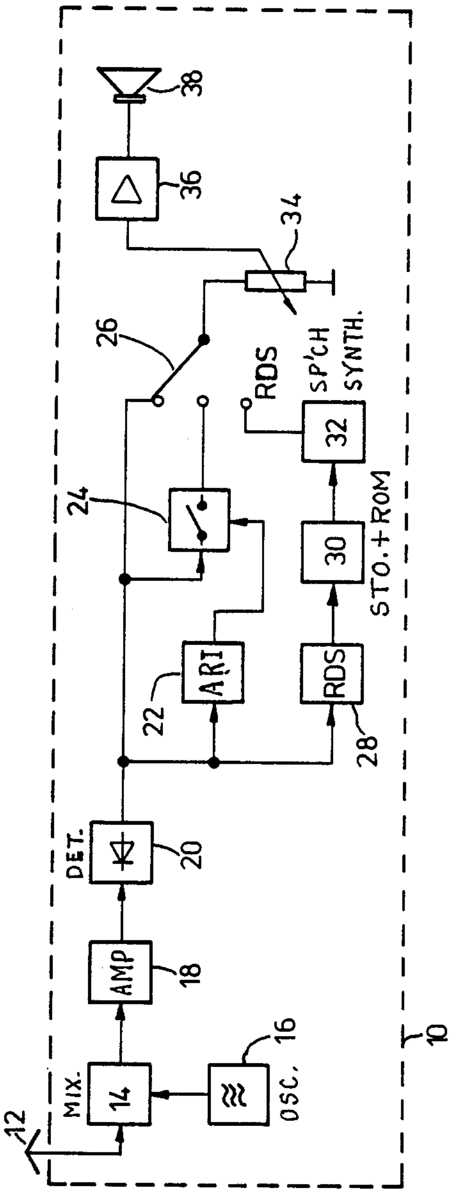
FIG. 1 is a schematic block circuit diagram of a radio receiver with separate decoders for each of the above-mentioned systems.

The radio receiver which is designated as whole with the reference numeral 10 comprises a receiver antenna 12 for reception of broadcasts from a traffic radio transmitter or from the other broadcast transmitter. In the usual way this radio receiver can include a mixing stage 14 which is controlled for tuning by an oscillator 16, an intermediate frequency amplifier 18 following the mixer 14, and a demodulator 20 following the IF amplifier 18.

The demodulator 20 is connected through a volume control 34 with an audio frequency final stage 36 through the loudspeaker 38 of which the demodulated signals can be reproduced. The radio receiver as so far described is conventional.

A first traffic transmission decoder 22 is connected to the demodulator 20 and has its output connected to a switching stage 24. The switch of the switching stage 24 is closed when a traffic announcement is transmitted and at the same time the program from the transmitter that was being received over the loud speaker 38 is interrupted. After the termination of the traffic information break the receiver is automatically switched back to the continuing radio broadcast program.

The switching stage 24 cooperates with the selector switch 26, that has 3 switch positions between which the volume contol 34 can be switched to 3 different switch contacts.

In the upper position of the switch the demodulated broadcast signal is supplied through the volume control 34 to the final audio stage 36. In the mid-position of the selector switch 26 traffic announcements from the first traffic decoder 22 are made audible.

The output of the demodulator 20 is also supplied to a RDS traffic message decoder 28, in parallel to the above-described connection that leads from the demodulator 20 to the decoder 22. The output of the decoder 28 addresses the memory 30 which may be a read-only memory (ROM) that has either an input or an output buffer, so that the message will be preserved until the next one comes to replace it. The buffer may even be a shift register with several successive buffer positions so that the last two or three messages may be retrieved either selectively or sequentially.

Each output of the memory 30 is the standard message addressed by the output of the decoder 28 and is a form for having the message read in the speech sythesizer 32 produce a voice frequency output that is supplied to the lower contact of the selector switch 26, so that in the the lower position of that selector switch the output of the speech sythesizer 32 is supplied through the volume control 34 to the final audio stage 36. The selector switch 26 remains connected for some time. The speech sythesizer message 32 shut itself off by means not shown and an audible output will not come again until the next message is provided by the decoder 28, unless the listener presses a repeat button (not shown) at some time to recall a message that is still stored.

Since the new radio receiver 10 is provided not only with the first traffic broadcast decoder 22, but also with a RDS traffic broadcast decoder 28, a selector switch 26 makes available either the first decoder or the RDS decoder to the audio frequency final stage 36, connecting the synthetic speech output of the synthesizer 32 to the audio stage 36 in the latter instance.

Thus when the switch 26 is in its upper position the listener hears the regular broadcast program and all the interruptions providing traffic information broadcast by the same station. In its middle position the switch 26 enables the listener to hear only ARI traffic information messages and in the bottom position the listener can hear RDS traffic messages. In either of the two lower positions of the switch 26 he hears the traffic messages when they come. Both types of traffic messages are available, it does not make any difference to the listener by which system the messages come. It is therefore assured that during the transition phase in which both systems are in use all of the traffic broadcasts will be able to be heard.

Figure 2:
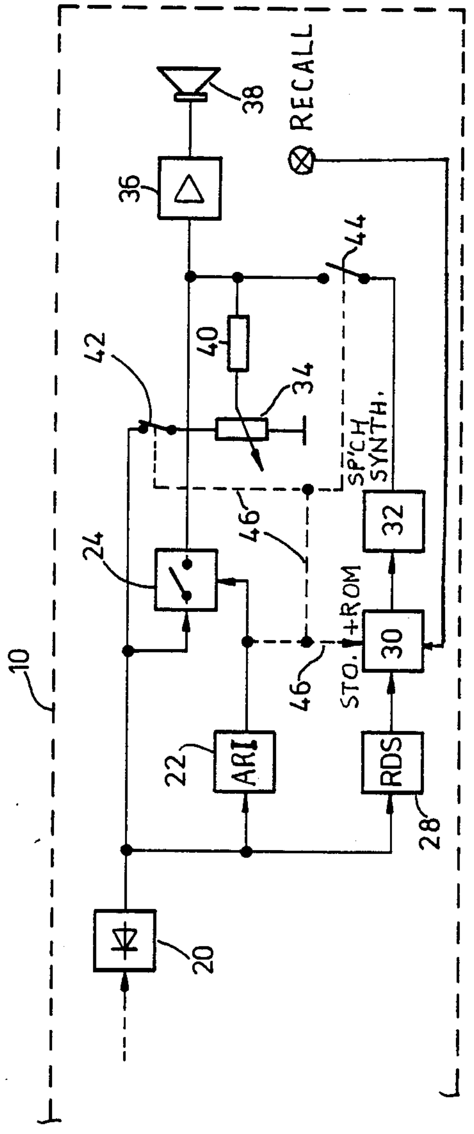
FIG. 2 is a block circuit diagram of a modified embodiment of the radio receiver of FIG. 1.

FIG. 2 is a modification of the circuit of FIG. 1 which takes care of the case in which a transmitted broadcast makes traffic information simultaneously available both according to the first (ARI) system already in use and also according to RDS principles, so that both decoders would at least on some occasions operate at the same time.

In the FIG. 2 embodiment of the invention the decoder 22 of the first system has priority of switching to the final audio stage 36 for operating the loud speaker. In such a case the concurrently received RDS traffic information decoded by the decoder 28 remains stored in the memory 30 at first and is not switched to the audio frequency final stage 36 until after the end of the traffic message, so that only then does the reproduction of the message by the speech synthesizer 32 take place. The audio frequency final stage 36 is in this case connected through the volume control 34 through a decoupling resistance 40.

The last described manner of operation with simultaneous availability of both systems of traffic message information superposed on the same broadcasting station signal is illustrated in FIG. 2 by the broken line 46. During reproduction of the ARI traffic device the switches 42 and 44 are open so that both the normal broadcast program and the output of the speak synthesizer 32 are switched off from the input of the audio frequency final stage 36.

After the traffic information has been heard through the final stage, the switch 42 of FIG. 2 is closed for returning to reception of the normal broadcast program, while the switches 24 and 44 are open. In the case of transmission of a RDS docket message, only the switch 44 is closed, while the switches 42 and 24 are open. The possibility is thus provided to supply a stored RDS traffic message through the speech synthesizer 32 to the audio frequency final stage 36 and to make it audible that the loud speaker 38.

Although the invention has been described with reference to particular illustrative examples it will be understood that variations and modifications are possible within the inventive concept.

I claim:

1. Radio broadcast receiver capable of receiving traffic information modulated on any subcarrier which is in turn modulated on the broadcast carrier for receiving either of both of two different kinds of traffic information modulation that they be provided on said subcarrier, comprising:

a first traffic signal decoder (22) for decoding traffic information signals provided in analog modulation and said subcarrier including those designating patient and regional identification of the traffic information;

a second traffic information decoder (28) for decoding a digitally incoded traffic information modulated on said subcarrier by double-sideband suppressed-carrier modulation, said second decoder including speech synthesizer means for providing an output of said second decoder into a form readily convertible into intelligible audible signals;

program detection means (20);

means for audio frequency amplification and for converting amplified signals into audible information, suitable for connection to the respective outputs of said broadcast detection means, said first decoder and said second decoder;

automatic switch means responsive to the presence of a traffic information signal in a said decoder for disconnecting said audio frequency amplifier from said broadcast signal detector means during the presence of a traffic information signal and for leaving said audio frequency amplifier connected to said detector means in the absence of a traffic information signal, and selector switch means both for selectively connecting as of the output of said first decoder or the output of said second decoder to said audio frequency amplifier means at least when a traffic information signal is presented on said subcarrier.

2. Broadcast radio receiver as defined in claim 1, wherein said automatic switch means is connected to said decoder for interrupting the connection between said detector means and said audio frequency amplifier means only when traffic information recognized in said decoder as having an urgency priority is present on said subcarrier.

3. Radio broadcast receiver as defined in claim 1, wherein said selector switch means are provided as a switching system whereby the output of said first decoder normally has priority over the output of said second decoder for connection to said low frequency amplifier and manipulation by a user of the broadcast receiver is necessary for substituting an output from said second decoder.

4. Radio broadcast receiver as defined in claim 2, wherein said selector switch means are provided as a switching system whereby the output of said first decoder normally has priority over the output of said second decoder for connection to said low frequency amplifier and manipulation by a user of the broadcast receiver is necessary for substituting an output from said second decoder.

5. Radio broadcast receiver as defined in claim 1, wherein said second decoder includes storage means capable of storing traffic information at least partially decoded by said second decoder until a subsequent traffic information message is at least partially decoded.

6. Radio broadcast receiver as defined in claim 2, wherein said second decoder includes storage means capable of storing traffic information at least partially decoded by said second decoder until a subsequent traffic information message is at least partially decoded.

7. Radio broadcast receiver as defined in claim 3, wherein said second decoder includes storage means capable of storing traffic information at least partially decoded by said second decoder until a subsequent traffic information message is at least partially decoded.

8. Radio broadcast receiver as defined in claimed 4, wherein said second decoder includes storage means capable of storing traffic information at least partially decoded by said second decoder until a subsequent traffic information message is at least partially decoded.

9. Radio broadcast receiver as defined in claim 5, wherein means are provided for connecting said audio frequency amplifier to the output of said second decoder for reproduction of a traffic information message at least once while signals of said message which are at least partially decoded are stored in said storage means of said second decoder.

10. Radio broadcast receiver as defined in claim 6, wherein means are provided for connecting said audio frequency amplifier to the output of said second decoder for reproduction of a traffic information message at least once while signals of said message which are at least partially decoded are stored in said storage means of said second decoder.

11. Radio broadcast receiver as defined in claim 7, wherein means are provided for connecting said audio frequency amplifier to the output of said second decoder for reproduction of a traffic information message at least once while signals of said message which are at least partially decoded are stored in said storage means of said second decoder.

12. Radio broadcast receiver as defined in claim 8, wherein means are provided for connecting said audio frequency amplifier to the output of said second decoder for reproduction of a traffic information message at least once while signals of said message which are at least partially decoded are stored in said storage means of said second decoder.

13. Radio broadcast receiver as defined in claim 5, wherein recall switch means are provided connected to said storage means for manually initiated read-outs of traffic information stored in said storage means and for connection of said audio frequency amplifier to said speech synthesizer means of said second decoder for making said read-outs audible.

14. Radio broadcast receiver as defined in claim 6, wherein recall switch means are provided connected to said storage means for manually initiated read-outs of traffic information stored in said storage means and for connection of said audio frequency amplifier to said speech synthesizer means of said second decoder for making said read-outs audible.

15. Radio broadcast receiver as defined in claim 7, wherein recall switch means are provided connected to said storage means for manually initiated read-outs of traffic information stored in said storage means and for connection of said audio frequency amplifier to said speech synthesizer means of said second decoder for making said read-out audible.

16. Radio broadcast receiver as defined in claim 8, wherein recall switch means are provided connected to said storage means for manually initiated read-outs of traffic information stored in said storage means and for connection of said audio frequency amplifier to said speech synthesizer means of said second decoder for making said read-outs audible.

* * * * *